May 22, 1923.

M. IVANCIC

BAKING DEVICE

Filed Jan. 8, 1921

May 22, 1923.
M. IVANCIC
BAKING DEVICE
Filed Jan. 8, 1921
1,456,238
2 Sheets-Sheet 2
Fig. 4.
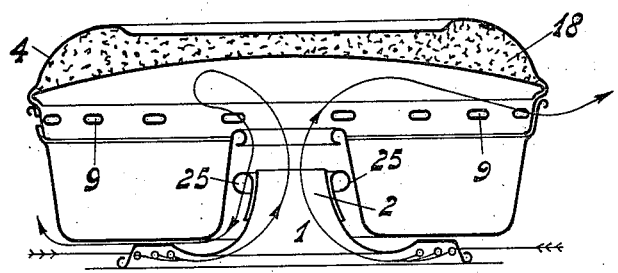
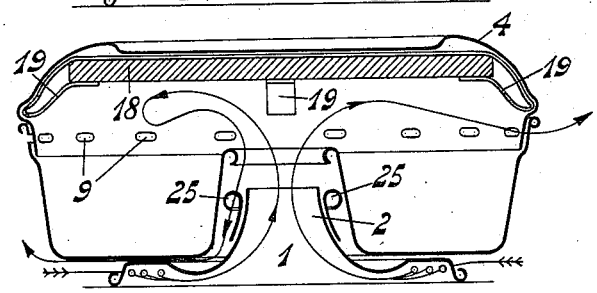
Fig. 5.
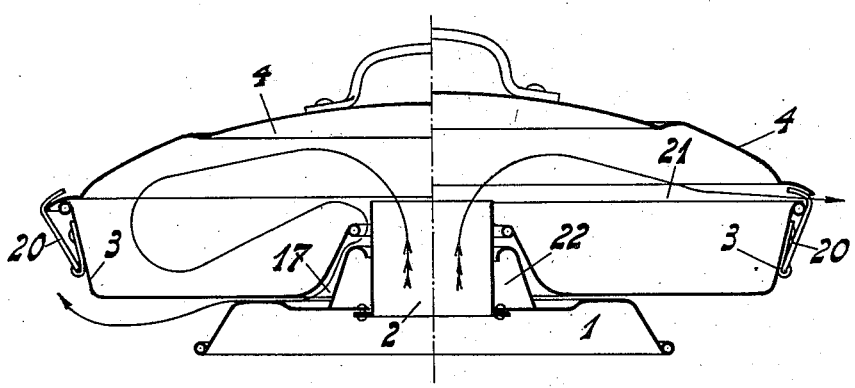
Fig. 6.

Patented May 22, 1923.

1,456,238

UNITED STATES PATENT OFFICE.

MILAN IVANCIC, DECEASED, LATE OF KILCHBERG, SWITZERLAND, BY ALMA IVANCIC, ADMINISTRATRIX, OF KILCHBERG, SWITZERLAND.

BAKING DEVICE.

Application filed January 8, 1921. Serial No. 435,849.

*To all whom it may concern:*

Be it known that MILAN IVANCIC, deceased, late a subject of the King of Italy, and resident of No. 3 Haldenweg, Kilchberg, Canton Zurich, Switzerland, had invented new and useful Improvements in Baking Devices, of which the following is a specification.

The object of this invention is to provide an improved baking device which may be used for making cakes, pies, stews, tarts, and for other and similar purposes, and with this and other objects in view the invention consists in a device of the class specified constructed as hereinafter described and claimed.

The invention is fully described in the following specification of which the accompanying drawings form a part and in which:

Figs. 3 to 6 show each a modified construction of the baking device in cross-section.

Figure 1:
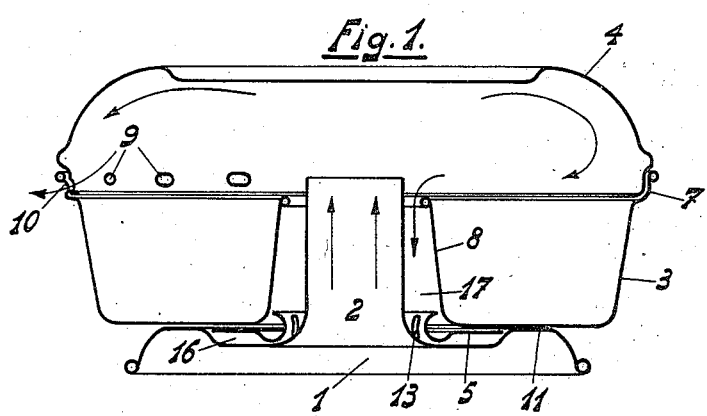
Fig. 1 is a cross-section of the improved baking device.
Figure 2:
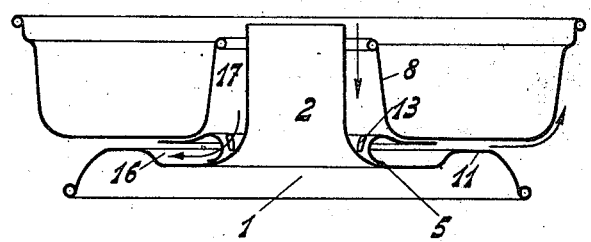
Fig. 2 shows the same device, the position of parts being altered.
Figure 3:
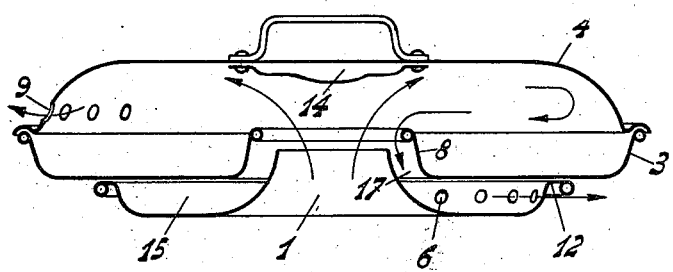

In the drawings (Figs. 1 and 2) 1 denotes a base made of sheet metal adapted to be placed over a gas-burner of known construction. On the base 1 rests an annular pan 3 which is covered by a lid 4. The base 1 is provided with a tubular projection 2 which projects through the central space 17 in such a manner that the gases of combustion enter the pan 3. The tube 2 prevents the hot gases of combustion from coming in contact with the inner wall 8 of the pan 3, and hence an over heating of said wall and a burning of the goods to be baked is obviated. The pan 3 is provided with an outer upright rim 7 having a row of holes 10. The lid 4 which fits said rim is provided with holes 9 which may be brought to register with the holes 10 of the pan 3 or by turning the lid 4 may be closed wholly or partly by the said rim 7. Between the pan 3 and the base 1 there is a ring 5 having a flat rim and a bend in which a row of holes 13 is provided. The said ring 5 is placed in a circular groove 16 of the base 1. In the position of the parts shown in Fig. 1 the pan 3 rests on a rib 11 of the base 1. The hot gases pass through the tube 2 into the pan 3 and heat the goods contained therein from above. The holes 9, 10 are in register and the gases escape through the holes 9, 10. In the position of the parts shown in Fig. 2 the holes 9 are kept closed by the rim 7. The ring 5 is reversed and carries now the pan 3. Between the bottom of the pan 3 and the ridge 11 there is a slot through which the gases passing through the holes 13 escape. According to the kind of goods to be baked the one or other arrangement of the parts is resorted to. The device shown in Fig. 3 comprises a shallow pan 3 which is covered by a lid 4 having holes 9. Opposite the central opening 8 of the pan 3 the lid 4 is provided with a baffle plate 14 fixed to the lid 4. The base 1 forms a shallow circular disk 15 having holes 6 at its outer rim 12 on which rim the pan 3 rests. The gases enter the device by the central opening 8 and leave the same through the space 17 and partly through the holes 9. Either one or the other of the rows of holes 6, 9 may be made if the remaining holes are large enough to promote a circulation of gas through the device.

In the device shown in Fig. 4 the lid 4 is provided with a heat-accumulating material 18 for instance cement which material is heated by the gas and gives the heat off by and by insuring thereby a good baking of the cake, etc. The ring 5 is done away with and the pan 3 rests with its tapering central tube on four pieces 25 fixed to the base 1. The base 1 is provided with holes, the gases take the path indicated by arrows either through the holes 9 or through the holes in the base or through the slot 9ª between the base and the pan.

The construction shown in Fig. 5 differs in that from the device shown in Fig. 4 that a brick 18 of non-combustible material is held in the lid 4 by means of a metallic clamp 19 held in a groove of said lid 4. The brick accumulates heat from the gases and gives off the same uniformly so that baking in the pan is greatly facilitated.

In the device shown in Fig. 6 no holes in the pan, in the lid and in the base are provided. The lid 4 is held by hooks 20 hinged to the side wall of the pan 3 (see left side of Fig. 6). The pan 3 rests on a base 1 with central tube 2 and is centered by a cone 22 to prevent the side walls of pan 3 to come into contact with the tube 2. If the lid 4 rests on the pan 3 (left side of Fig. 6) the gases pass through the space 17 and interstices between base 1 and pan 3 as shown by an arrow. A slot 21 may be formed by inserting the upper end of the hooks 20 between the lid 4 and the upper edge of the pan 3 (see right had side of Fig. 6).

The divice may be made from sheet metal for instance for aluminium.

The invention is not limited to the exact form, construction and arrangement of parts shown and described and I therefore reserve the right to make all such alterations therein and modifications thereof, as fairly come within the scope of the invention.

What I claim and wish to secure by the United States Letters Patent is:

A baking device comprising a pan having an opening in the bottom and an inner wall rising from the bottom and around said opening, a lid on the pan, and a base on which the pan is mounted, said base having a tubular projection passing through the said bottom opening of the pan, said pan and base being so constructed and arranged as to carry off the gases from the interior of the pan.

In witness whereof I affix my signature.

ALMA IVANCIC,
*Administratrix of Milan Ivancic, deceased.*